(12) United States Patent
Bachmann et al.

(10) Patent No.: US 7,983,229 B2
(45) Date of Patent: Jul. 19, 2011

(54) FAST CONTEXT ESTABLISHMENT FOR INTERWORKING IN HETEROGENEOUS NETWORK

(75) Inventors: Jens Bachmann, Oberursel (DE); Rolf Hakenberg, Darmstadt (DE)

(73) Assignee: Panasonic Corporation, Osaka (JP)

(*) Notice: Subject to any disclaimer, the term of this patent is extended or adjusted under 35 U.S.C. 154(b) by 970 days.

(21) Appl. No.: 11/575,394

(22) PCT Filed: Jun. 27, 2005

(86) PCT No.: PCT/EP2005/006900
§ 371 (c)(1),
(2), (4) Date: Sep. 21, 2007

(87) PCT Pub. No.: WO2006/029663
PCT Pub. Date: Mar. 23, 2006

(65) Prior Publication Data
US 2008/0165740 A1    Jul. 10, 2008

(30) Foreign Application Priority Data
Sep. 16, 2004 (EP) .................................. 04022084

(51) Int. Cl.
*H04W 4/00* (2009.01)
(52) U.S. Cl. .................. 370/338; 370/401; 709/223
(58) Field of Classification Search .............. None
See application file for complete search history.

(56) References Cited

U.S. PATENT DOCUMENTS

| | | | |
|---|---|---|---|
| 2004/0066769 A1 | 4/2004 | Ahmavaara et al. | |
| 2004/0106403 A1 | 6/2004 | Mori | |
| 2005/0025164 A1* | 2/2005 | Kavanagh et al. | 370/401 |
| 2009/0129319 A1* | 5/2009 | Buddhikot et al. | 370/328 |

FOREIGN PATENT DOCUMENTS

| | | |
|---|---|---|
| EP | 1009176 | 6/2000 |
| JP | 2004-179882 | 6/2004 |

OTHER PUBLICATIONS

PCT International Search Report dated Sep. 27, 2005.
Japanese Notice of Reasons for Rejection dated Aug. 3, 2010 with English translation.
B. Aboba, et al. "The Network Access Identifier" Network Working Group, Jan. 1999. Copyright The Internet Society (1999) pp. 1-8.
3GPP TS 22.234 V6.1.0 (Jun. 2004) "3rd Generation Partnership Project; Technical Specification Group Services and System Aspects; Requirements on 3GPP systems to Wireless Local Area Network (WLAN) interworking (Release 6)" pp. 1-13.

(Continued)

*Primary Examiner* — Kevin C Harper
(74) *Attorney, Agent, or Firm* — Dickinson Wright PLLC (57) ABSTRACT

The invention relates to a method for configuring connection parameters of a connection between a mobile terminal and a target wireless access network in a handover between heterogeneous wireless access networks, wherein the mobile terminal is handed over from an originating wireless access network to a target wireless access network. Moreover, the invention provides a packet data gateway and an authentication server which are adapted to participate and execute a part of the steps of the configuration method. To provide a solution for establishing connection to a wireless access network, as for example a WLAN, as fast as possible, in particular in a handover, the invention proposed to pre-configure a tunnel to be established between a packet data gateway and the mobile terminal for packet data service provision via the target wireless access network based on context information already maintained for the packet data service.

26 Claims, 3 Drawing Sheets

OTHER PUBLICATIONS

3Gpp TS 29.234 V1.70 (Aug. 2004) "3rd Generation Partnership Project; Technical Specification Group Core Network; 3GPP System to WLAN Interworking; Stage 3 Description (Release 6)" pp. 1-57.

3GPP TS 23.234 V6.1.0 (Jun. 2004) "3rd GeneratIon Partnership Project; Technical Specification Group Services and System Aspects; 3GPP system to Wireless Local Area Network (WLAN) interworking; System descriprion (Release 6)" pp. 1-94.

3GPP TS 24.234 V1.60.0 (Aug. 2004) "3rd Generation Partnership Project; Technical Specification Group Core Network; 3GPP System to WLAN Interworking; UE to Network protocols; Stage 3 (Release 6)" pp. 1-24.

3GPP TS 23.060 V6.5.0 (Jun. 2004) "3rd Generation Partnership Project; Technical Specification Group Services and System Aspects; General Packet Radio Service (GPRS); Service Description; Stage 2 (Release 6)" pp. 1-211.

* cited by examiner

FAST CONTEXT ESTABLISHMENT FOR INTERWORKING IN HETEROGENEOUS NETWORK

FIELD OF THE INVENTION

The invention relates to a method for configuring connection parameters of a connection between a mobile terminal and a target wireless access network in a handover between heterogeneous wireless access networks, wherein the mobile terminal is handed over from an originating wireless access network to a target wireless access network. Moreover, the invention provides a packet data gateway and an authentication server which are adapted to participate and execute a part of the steps of the configuration method.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

Another issue becoming more and more important for future mobile communication networks is the interworking between different access network technologies in heterogeneous networks.

It has been recognised that WLANs (Wireless Local Area Networks) are, and will continue to be deployed by independent operators and that these WLANs may or may not be interworked with a mobile communication systems, such as 3GPP systems. Further, these WLANs may overlap partially or completely with WLANs that are interworked with Home and/or Visited mobile communication systems. Lastly, WLANs interworked with Home and Visited 3GPP systems may also overlap each other, as well as the radio access networks for each mobile communication system. These situations create multiple permutations of coverage areas and service states which will need to be carefully understood and managed.

In this respect the 3GPP has standardized the interworking of 3G networks and WLAN (see 3GPP TR 22.934: "Feasibility study on 3GPP system to Wireless Local Area Network (WLAN) interworking", 3GPP TS 22.234: "Requirements on 3GPP system to Wireless Local Area Network (WLAN) interworking" and 3GPP TS 23.234: "3GPP system to Wireless Local Area Network (WLAN) interworking; System Description", all available at http://www.3gpp.org).

There are number of different possible operating environments where interworking of the 3GPP system and the WLANs may be desired. The 3GPP operates universally in Public, Corporate, or Residential environments. WLANs may also be deployed in any of these environments and it would be advantageous if the standards for 3GPP to WLAN interworking could accommodate all of these environments. Such capability would further enhance the ease of use for the mobile system user and virtually extend the effective coverage areas of each system.

The different environments may involve different administrative domains and wide diversity of WLAN technical capabilities. As an example, the security capabilities and policies may differ between public, corporate and residential WLANs. These differences may lead to different interworking methods between 3GPP and WLANs.

Different scenarios are identified describing different levels of interworking. E.g. scenario 2 describes 3GPP-based access control and charging, scenario 3 relates to accessing 3GPP PS based services, e.g. IMS, scenario 4 and 5 consider the access to 3GPP PS based services with service continuity.

The protocol details are separated in several documents. In 3GPP TS 24.234: "3GPP system to Wireless Local Area Network (WLAN) interworking; UE to Network protocols" the details of the protocols between WLAN UE and the network are described. In 3GPP TS 29.234: "3GPP system to Wireless Local Area Network (WLAN) interworking; Stage 3 Description" protocols for several network reference points are specified and in 3GPP TS 33.234: "Wireless Local Area Network (WLAN) interworking security" the security architecture, i.e. trust model and security requirements for the interworking of the 3GPP System and WLAN Access Networks are discussed.

The details of the WLAN Access Authentication and Authorization procedure from the architectural view are described in chapter 7.2 of 3GPP TS 23.234 and the W-APN Resolution and Tunnel Establishment in chapter 7.9 of 3GPP TS 23.234.

The description of the GPRS architecture with its entities and functionalities can be found in 3GPP TS 23.060: "General Packet Radio Service (GPRS); Service Descriptions; Stage 2". Especially the logical architecture in chapter 5.4, the GPRS attach procedure in chapter 6.5, the mobility management states in chapter 6.1.2, the location management procedures in chapter 6.9.2, the PDP context activation procedure in chapter 9.2 and the appropriate HLR GPRS subscription data, MM and PDP contexts in chapter 13 are explained.

A new mechanism for signalling of QoS (Quality of Service) reservations is currently in the standardization process in the IETF and specified in the Internet Draft by Van den Bosch et al. "NSLP for Quality-of-Service signalling" (draft-ietf-nsis-qos-nslp-04.txt, available at http://www.ietf.org". This mechanism comprises among others the possibility to query resources in a path before initiating a reservation.

In 3GPP system to WLAN interworking the establishment of a 3GPP packet-based service from WLAN results in WLAN Access Authentication and Authorisation (the user is allowed to use the WLAN) followed by WLAN Tunnel Establishment to a packet data gateway (PDG). This operation is also referred to as 3G packet-based service activation.

In case of a handover from the 3G network to the WLAN network, i.e. an handover between heterogeneous networks, the terminal has to perform the procedures in the same order, first the WLAN Access Authentication afterwards the WLAN Tunnel Establishment. The user's requested service and QoS requirements are not known until the tunnel establishment request message arrives and also the selected PDG isn't known and thus the QoS negotiation can't be initiated before.

On the other hand if a user has a 3GPP packet-based service activated in a 3G network, a tunnel is established from the GGSN (Gateway GPRS Support Node) to the UTRAN (UMTS Terrestrial Radio Access Network) and user related context information (including the APN (Access Point Name)

and QoS requirements) are stored in the GGSN and SGSN (Serving GPRS Support Node). Thus the resource setup and the use of the WLAN connection are delayed although necessary service and QoS information are already available in 3G entities. WLAN provides higher data rates and lower delay than UMTS, but the cell coverage is in general much smaller.

SUMMARY OF THE INVENTION

The object of the invention is therefore to provide a method that allows establishing connection to a wireless access network, as for example a WLAN, as fast as possible.

The object is solved by the subject matter of the independent claims. Advantageous embodiments of the invention are subject matters to the dependent claims.

One main aspect of the invention is to enable an authentication server authenticating a mobile terminal when joining a wireless access network, such as a WLAN, to determine a network entity within the core network, which maintains context information on a packet based service received by the mobile terminal. By signalling the relevant context information to the core network's gateway and to the wireless access network the mobile terminal is joining, a tunnel from this gateway to the mobile terminal via the wireless access network can be pre-configured according to the context information before the tunnel is established. Thereby, the latency in setting up the tunnel (which may involve additional authentication and authorization procedures) may be significantly improved by the pre-configuration.

According to one exemplary embodiment of the invention relating to UMTS to WLAN interworking, an AAA server (Authentication Authorization Accounting) may determine the current 3G SGSN of the user which is presently responsible for sending service related packet data to the user via the 3G wireless access network. This determination may be for example made during the execution of the WLAN Access Authentication procedure. The user context is requested from the 3G SGSN and APN resolution, service authorization and QoS procedures are executed before the tunnel establishment request is received. Thus, QoS establishment and 3G to WLAN handover can be initiated much faster.

One embodiment of the invention relates to method for configuring connection parameters of a connection between a mobile terminal and a target wireless access network in a handover between heterogeneous wireless access networks. The mobile terminal is handed over from an originating wireless access network to a target wireless access network. According to this embodiment a packet data service may be provided to the mobile terminal via the originating wireless access network.

A network node of a core network connected to at least the originating wireless access network may maintain context information on the packet data service, wherein the context information indicate at least QoS constraints of the packet data service.

An authentication server may authenticate the mobile terminal at the target wireless access network. The authentication server may further obtain the context information from the network node maintaining the context information and may provide data indicative of the context information to a packet data gateway in a core network.

A connection, e.g. in form of a tunnel for transporting data packets associated to the packet data service between the mobile terminal and the packet data gateway via the target wireless access network may be established. The tunnel may be associated at least to QoS constraints.

The packet data gateway may cause a pre-configuration of at least the tunnel's QoS constraints based on the data received from the authentication server before establishing the tunnel.

In a further embodiment, the network node maintaining the context information may be the SGSN responsible for the packet data service provision to the mobile terminal via the originating wireless access network, which could be a UTRAN. Further, the context information may be information in a PDP context, which is established for the packet data service in the UTRAN and core network, of the SGSN. The context information according to the invention may be information referring to a set of information that describes a mobile wireless service call or session, which is used by mobile stations and GSNs (GPRS Support Nodes) in a GPRS based network to identify the call or session.

According to another embodiment of the invention the authentication server may obtain an identification of the network node maintaining the context information from a database comprising information on the mobile terminal.

In a variation of this embodiment, the database is the HLR/HSS of the home network of the mobile terminal. The database may thus be any database that contains information about subscribers to a mobile network. The database may register subscribers for a particular service and store subscriber information, including for example the service profile, location information, and the activity status of the mobile user.

In a further embodiment of the invention the authentication server may further receive a network access identifier of the mobile terminal during authentication, and may derive a unique identifier of the mobile therefrom. In a variant, this unique identifier of the mobile terminal may be transmitted to the database and the authentication server may receive the identification of the network node maintaining the context information from the database. According to this variant, the unique identifier, which could for example be the IMSI of the mobile terminal, could be used for obtaining the identification of the network node maintaining the context information for the mobile terminal.

Further, the authentication server may then use the identification of the network node to address the network node maintaining the context information when obtaining the context information.

Another embodiment of the invention relates to enhancing the packet data gateways functionality to allow taking into account the target wireless access network's available resources when pre-configuring the tunnel to be established for service provision. According to this embodiment, the packet data gateway may obtain information on the available resources in the target wireless access network, and may base the pre-configuration of the tunnel on the available resources in the target wireless access network.

In a further embodiment of the invention at least one authentication message is transported from the target wireless access network to the authentication server in the authentication process, the at least one authentication message comprises an identifier of the target wireless access network. The authentication server may derive a routing area identifier, identifying the network node maintaining the context information, from the identifier of the target wireless access network. This routing area identifier may be further in a message requesting the context information from the network node maintaining the context information. Thereby, standardized context request mechanism could be reused. However, it is apparent, that also new messages and/or processes may be defined to allow the authentication server to obtain context information.

In another embodiment of the invention the data provided from the authentication server to the packet data gateway further indicates at least one of the mobile terminals identity, the target wireless access network, requested services by the mobile terminal, and information for mutual authentication during tunnel establishment.

According to a variant of this embodiment, this information may allow the packet data gateway to cause a pre-configuration of at least one of a security context comprising at least one security association, encryption keys, and a header compression scheme for header compression of data packets for packet data exchange via the tunnel. Thus, it is recognized that the packet data gateway may not only be provided with QoS relevant information of the packet data service but also with auxiliary information which may allow preconfiguring various processes or parameters (e.g. header compression, authentication, authorization, charging, etc.) employed in service provision via the target wireless access gateway.

Another embodiment of the invention relates to a situation, wherein the handover of the mobile terminal between the originating and the target wireless access network occurs in visited networks. Thus, the mobile terminal may roam in a visited core network comprising the packet data gateway and the network node maintaining the context information, and may be handed over from a visited originating wireless access network to a visited target wireless access network. The authentication of the mobile terminal at the target wireless access network may thereby involve a proxy authentication server in the visited core network and an authentication server in the home core network of the mobile terminal. Hence, the authentication proxy server may for example relay the authentication request from the respective visited network to the authentication server in the home network of the mobile terminal.

It should be recognized, that the embodiments described herein are not limited to a handover between heterogeneous networks both residing in visited networks. According to another embodiment of the invention the packet data gateway and the network node maintaining the context information is either located in the same core network or in distinct core networks respectively. Thus, it could be for example also possible that the mobile terminal is handed over from a UTRAN connected to the home core network and a WLAN connected to a visited core network.

It is further recognized, that the core network may for example be a GPRS network and the originating wireless access network is a radio access network of a mobile communication network (e.g. a UTRAN) and the target wireless access network is another wireless network such as a WLAN.

A further embodiment of the invention provides a packet data gateway located in a core network of a mobile communication system for configuring a connection for a packet data service to be provided to a mobile terminal via a target wireless access network. The mobile terminal may thereby be handed over between heterogeneous wireless access networks from an originating wireless access network to the target wireless access network.

According to the embodiment, the packet data gateway may comprise communication means for communicating with the mobile terminal and an authentication server in the core network. These communication means may be adapted to establish a tunnel between the packet data gateway and the mobile terminal for exchanging data packets of the packet data service via the target wireless access network, wherein the tunnel is at least associated to QoS constraints.

Moreover, the communication means could be adapted to receive data from the authentication server, wherein this data is indicative of at least QoS constraints of the provided packet data service.

The packet data gateway may also further comprise configuration means for causing a pre-configuration of at least the tunnel's QoS constraints based on the data received from the authentication server before establishing the tunnel.

In a further embodiment of the invention, the communication means may be adapted to receive data provided from the authentication server which indicates at least one of the mobile terminals identity, target wireless access network, requested services by the mobile terminal and information for mutual authentication during tunnel establishment.

In another embodiment of the invention the configuration means is further adapted to cause a pre-configuration of at least one of a security context comprising at least one security association, encryption keys, and a header compression scheme for header compression of data packets transported via the tunnel for packet data exchange via the tunnel.

Further, the communication means of the packet data gateway according to another embodiment of the invention is further adapted to obtain information on the available resources in the target wireless access network from an access server of the target wireless access network, and the configuration means is adapt to pre-configure of the tunnel based on the available resources in the target wireless access network.

A further embodiment of the invention provides an authentication server located in a core network of a mobile communication system communicating with a packet data gateway and authenticating a mobile terminal in a target wireless access network. As indicated above, the mobile terminal is handed over between heterogeneous wireless access networks from an originating wireless access network to the target wireless access network The authentication server may comprise authentication means for authenticating the mobile terminal at the target wireless access network, and communication means for obtaining context information from a network node within the core network. The context information may thereby indicate at least QoS constraints of a packet data service provided via the originating wireless access network.

The communication means may be adapted to provide data indicative of the context information to the packet data gateway to enable the packet data gateway to pre-configure at least the QoS constraints of a tunnel for providing the data packet service to the mobile terminal via the target wireless access network.

In a variation, the communication means is further adapted to receive a network access identifier during authentication of the mobile terminal, and the authentication server further comprises processing means for deriving a unique identifier of the mobile from the network access identifier.

In another variation the communication means is adapted to transmit the unique identifier of the mobile terminal to a database comprising information on the mobile terminal and to receive the identification of the network node maintaining the context information from the database.

According to another embodiment of the invention the authentication server's communication means is adapted to receive at least one authentication message from the target wireless access network in the authentication process. This at least one authentication message may comprise an identifier of the target wireless access network, and the processing means of the authentication server may be adapted to derive a routing area identifier, identifying the network node maintaining the context information, from the identifier of the target wireless access network.

Moreover, in a variation, the communication means is adapted to address the network node maintaining the context information by the derived routing area identifier when obtaining the context information.

In another embodiment of the invention the data provided from the authentication server to the packet data gateway further indicates at least one of the mobile terminals identity, target wireless access network, requested services by the mobile terminal, and information for mutual authentication during tunnel establishment.

Further embodiment of the invention relate to the implementation of the various embodiments of the configuration method outlined above in software, wherein different network entities of the core network(s) and the wireless access networks may comprise individual software components to execute their processes for participating in the configuration method.

For example, according to one embodiment of the invention a computer readable medium for storing instructions that, when executed by a processor of a packet data gateway located in a core network of a mobile communication system, cause the configuration of a connection for a packet data service to be provided to a mobile terminal via a target wireless access network, wherein the mobile terminal being handed over between heterogeneous wireless access networks from an originating wireless access network to the target wireless access network is provided. This may be achieved by communicating with the mobile terminal and an authentication server in the core network, establishing a tunnel between the packet data gateway and the mobile terminal for exchanging data packets of the packet data service via the target wireless access network, the tunnel being at least associated to QoS constraints, receiving data from the authentication server, the data being indicative of at least QoS constraints of the provided packet data service, and causing a pre-configuration of at least the tunnel's QoS constraints based on the data received from the authentication server before establishing the tunnel.

A further embodiment of the invention relates to a computer readable medium storing instructions that when executed by the processor of the packet data gateway enable the packet data gateway to participate in the configuration method according to the various embodiments of the invention outlined above.

Another embodiment provides a computer readable medium for storing instructions that, when executed by located in a core network of a mobile communication system, cause a communication between the authentication server and a packet data gateway and an authentication of a mobile terminal in a target wireless access network, wherein the mobile terminal is handed over between heterogeneous wireless access networks from an originating wireless access network to the target wireless access network. This may be for example accomplished by authentication means for authenticating the mobile terminal at the target wireless access network, obtaining context information from a network node within the core network, wherein the context information indicates at least QoS constraints of a packet data service provided via the originating wireless access network, and by providing data indicative of the context information to the packet data gateway to enable the packet data gateway to pre-configure at least the QoS constraints of a tunnel for providing the data packet service to the mobile terminal via the target wireless access network.

Further, another embodiment of the invention relates to a computer readable medium storing instructions that when executed by the processor of the authentication server enable the authentication server to participate in the configuration method according to the various embodiments of the invention outlined above.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to a UMTS communication system interworking with a WLAN. Also the terminology used in the subsequent sections mainly relates to the UMTS terminology and WLAN terminology. However, the used terminology and the description of the embodiments with respect to the UMTS to WLAN interworking architecture is not intended to limit the principles and ideas of the inventions to such systems.

Also the explanations given in the Technical Background section above are merely intended to better understand the mostly UMTS and WLAN specific exemplary embodiments described in the following and should not be understood as limiting the invention to the described specific implementations of processes and functions in the mobile communication network or WLAN.

Figure 1:
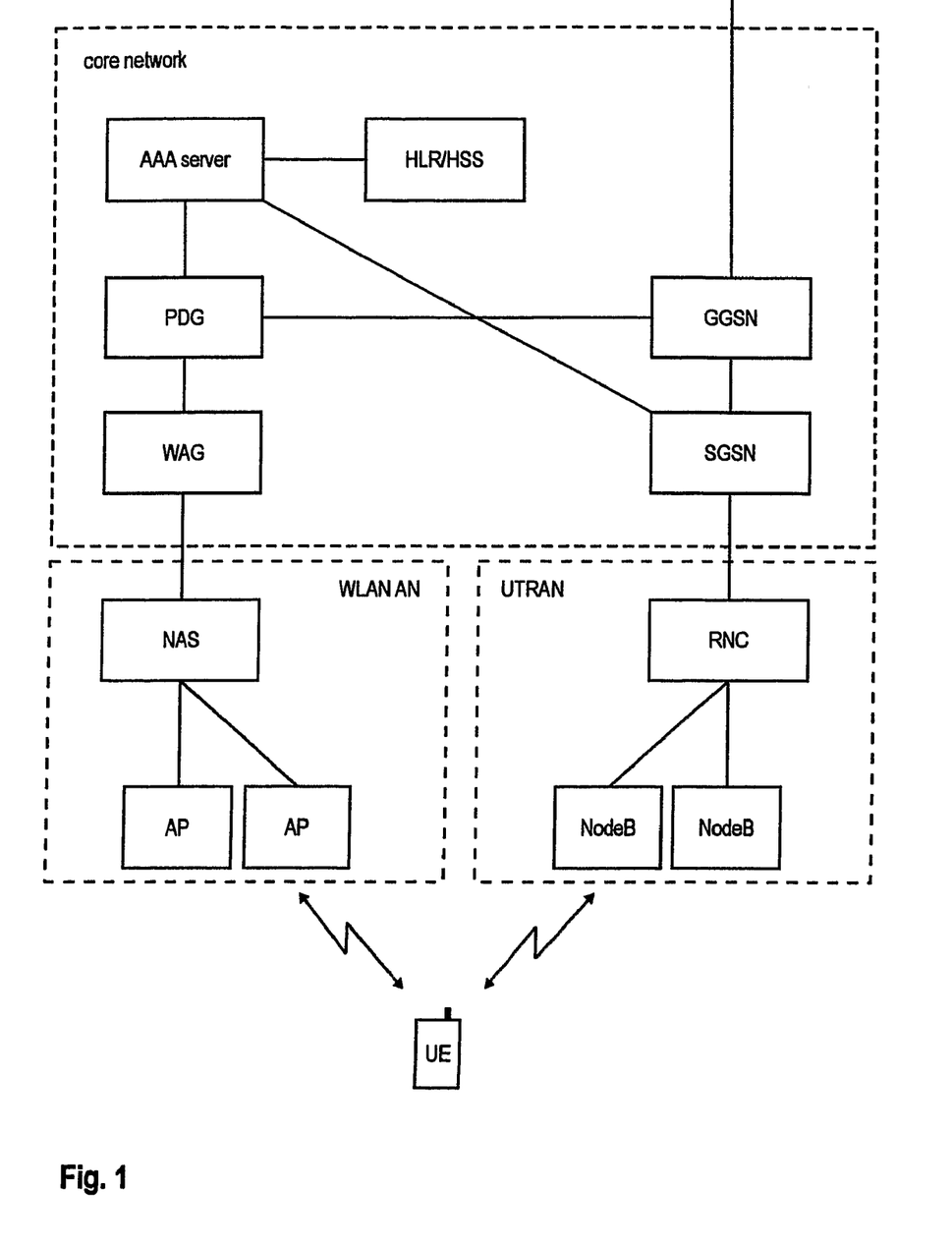
FIG. 1 shows an architecture for a 3GPP system to WLAN interworking supporting a handover of mobile terminals between the heterogeneous networks.

A possible architecture for 3GPP system to WLAN interworking with handover support is shown in FIG. 1. In addition to the current 3GPP system to WLAN interworking architecture for scenario 2 and 3, this architecture comprises an interface between the packet data gateway (PDG) and the GGSN for forwarding/relaying data packets from the GGSN to the PDG and vice versa. It should be noted that the functionality of the PDG is to a large extend similar to the one of the GGSN.

Further an interface between an authentication server, according to the exemplary architecture an AAA Server and the SGSN to request the MM (Mobility Management) and PDP (Packet Data Protocol) context for a user is included.

For a 3GPP/WLAN dual mode mobile terminal it is possible to access 3G services from an active 3G connection and also from an active WLAN connection.

In one embodiment of the invention the mobile terminal may perform a GPRS attach procedure in the 3G network in order to access GPRS services. After completing the GPRS attach procedure the mobile terminal is in the so-called "PMM connected state" and the MM context may be created in the SGSN. This context may inter alia comprise the IMSI of the user, the current MM state and the Routing Area that identifies one or several cells of the mobile terminal's current location. The routing area identifier (RAI) may be broadcasted to the mobile terminals in RRC Idle mode and mobile terminals in RRC Connected mode may be notified on established RRC (Radio Resource Control) connections.

If the user wants to start a 3G service (e.g. SMS, MMS, IMS) on its terminal, a service activation may be initiated by the PDP context activation procedure. In the PDP context activation procedure, the Access Point Name (APN) and the requested QoS is signaled. The APN may identify the GGSN and may identify the Packet Data Network and optionally a service to be offered. If the PDP context activation is accepted, a PDP context is established for example in the SGSN and the GGSN and PDP PDUs (Protocol Data Units) can be transferred between the mobile terminal and the GGSN.

If the mobile terminal has established a 3G service and detects WLAN coverage by scanning of WLAN beacons each WLAN beacon comprising a SSID identifying the respective WLAN, the handover from 3G to WLAN could be advantageously in terms of higher data rates and lower delay. Thus, a handover between the originating wireless access network, according to this example a UTRAN, and a target wireless access network, according to this example a WLAN, may be performed.

The mobile terminal may for example select one of the available WLANs based on the. received SSIDs. Further the mobile terminal could be provided with a list of preferred WLANs which may be used to a WLAN in case more than one beacon is received by the mobile terminal. The mobile terminal may establish a connection with the target wireless access network, i.e. the chosen WLAN. This connection establishment to the WLAN is also referred to as the mobile terminal associating to the WLAN.

After associating to the WLAN, the mobile terminal may need to be authenticated in the WLAN. For example the WLAN Access Authentication (Re-authentication) may be initiated for this purpose. During this WLAN Access Authentication procedure EAP (Extensible Authentication Protocol) messages are commonly exchange between the mobile terminal, the WLAN access network (AN) and the 3GPP AAA Server. For the authentication of the user the user identity may be provided to the AAA Server in a NAI format (NAI=Network Access Identifier; see RFC 2486: "The Network Access Identifier", available at http://www.ietf.org) in the EAP messages.

It should be noted that the mobile terminal is commonly assigned an IP address within the WLAN after being authenticated. Therefore, the mobile terminal does not yet have an IP Address assigned which implies that the WLAN should support means to transport AAA messages from the mobile terminal to an AAA Server. On WLAN side specific means as e.g. specified by the WLAN standards IEEE 802.11i could be used. The transport of EAP messages from the WLAN access network to the AAA Server could be accomplished over RADIUS or Diameter.

When transporting EAP messages via RADIUS or Diameter an identifier of the WLAN access network is included in the messages. This identifier can for example be included implicitly by including the optional sender IP address of the Network Access Server (NAS-IP) serving as a RADIUS client for the mobile terminal to a RADIUS message. Alternatively, the WLAN access network identifier may also be included explicitly, for example by including the WLAN access point's MAC address (link identifier) or the access routers address (APID) to an EAP message by the mobile terminal or by an entity in the WLAN access network.

During the WLAN Access Authentication the AAA server may derive a unique identifier of the mobile terminal, e.g. the IMSI of the user, from the NAI and may request for example the HLR/HSS for the current SGSN serving the mobile terminal in the originating UTRAN. Upon receiving an identification of the SGSN from the HLR/HSS, the AAA server may provide a context request message (which may include the unique identifier) to the SGSN to request context information which defines at least the QoS parameters of the packet data service. For example, the AAA Server may request the MM context and PDP context for the user (mobile terminal).

Alternatively, the query of the HLR/HSS database may be omitted. It may also be possible to obtain an SGSN identifier or address of the SGSN serving the mobile terminal in the originating UTRAN by a mapping table allowing mapping the WLAN's access network identifier to an SGSN identifier or address. As indicated above, the WLAN access network identifier is included in an EAP message of the authentication procedure. The AAA server may map the WLAN access network identifier to an SGSN identifier or address directly or to a RAI first and may subsequently determine which SGSN is responsible for the routing area associated to the RAI.

In the standard GPRS SGSN context request message the old RAI and mobile terminal validated is included besides the IMSI. However, the old RAI is usually not known to the AAA Server. One possibility to minimize changes to the current standard procedures may be that the AAA Server has access to a mapping functionality and is therefore able to map the received WLAN access network identifier to one or several Routing Area Identifier(s) of the 3G network. This derived RAI is then included in the context request message to the SGSN. Hence, according to this exemplary implementation, already specified context request messages may be reused to query context information.

Nevertheless a modification to the standard messages may also be foreseen because the SGSN context request message according to the standardized procedures triggers the SGSN to send a SRNS context request message to the old RNC. Upon reception of the SRNS context request message the serving radio network subsystem (SRNS) buffers and stops the transmission of downlink PDUs to the mobile terminal via the originating UTRAN.

It may be desirable to avoid this mechanism because the mobile terminal is still able to receive downlink PDUs via the originating UTRAN. Therefore, a flag could be included in the context request message indicating that the SGSN should not send the SRNS context request message to the old RNC. One exemplary implementation or work-around could be that upon receiving a context request message from the AAA server, the SGSN serving the mobile terminal may stop providing new packets to the terminal via the originating UTRAN but relays the packets to the serving PDG instead. Only the packets buffered within the SRNS are provided to the mobile terminal via the origination UTRAN. In a variation, the radio bearer established in the originating access network and its connections to the core network may be torn down after having transferred the buffered packets.

In response to the request, the SGSN may send a context response message, which may for example include the MM context and the PDP context to the AAA server. Thus the AAA server is now informed about the previous APNs and requested and negotiated QoS of the mobile terminal. It is noted that, depending on the chosen implementation, it may not be necessary to transfer the complete context information to the AAA server. For example, if only a preconfiguration of QoS constraints is foreseen only QoS relevant information may be provided to the AAA server.

Alternatively to using already standardized mechanisms or improved versions thereof for context transfer between SGSN and AAA Server, new messages and procedures may be foreseen to allow the AAA server requesting the context information from the SGSN serving the mobile terminal in the originating UTRAN.

In a next optional step the AAA server could further verify that the mobile terminal is authorized to access services through the WLAN network which could be accessed through the UTRAN. Next, e.g. if the mobile terminal is allowed to, the AAA server may determine the PDG that will serve the mobile terminal for service provision via the target access network, i.e. WLAN in the present exemplary embodiment. The AAA server may inform this PDG about the identity of the mobile terminal, the identity of the WLAN, the possibly requested services, and related QoS. In a variation, the PDG is further informed on information for mutual authentication of the tunnel establishment, i.e. may be provided with a security context, and/or parameters for a header compression scheme to be used.

From the service information and QoS information received, the PDG may pre-configure a tunnel to the mobile terminal via the target access network, i.e. the WLAN in the present exemplary embodiment.

Further, in another embodiment of the invention, the PDG may use the service information and QoS information received for constructing a QoS query message in a format appropriate to the QoS mechanism on the tunnelling path from the PDG to the WLAN. For example, the WLAN identifier received during the WLAN Access Authentication procedure from the AAA server may serve for the determination of the path.

With this message the available resources for the tunnel may be requested. This may for example be performed on a per-flow basis or for an aggregate set of flows. Further a tunnel flow/session identifier may be included in the query messages, which is assigned by the PDG.

In case of NSIS QoS-NSLP being applied on the PDG to WLAN path, a QoS-NSLP QUERY message can be sent. This query message may be directed to the NAS from which the authentication procedure of the mobile terminal was initiated. On the path to the NAS the available resources are checked in the QoS-NSLP supporting NSIS entities (QNE) and included in the query message. If the query message is received by the NAS a response message is sent back on the path to the PDG. After the response message is received by the PDG, the PDG is aware of the available QoS on the path and may use this information to pre-configure the tunnel to the mobile terminal.

If there are network management entities, which enforce the traffic in border nodes in the domains across the path, the PDG may alternatively communicate directly to these network management entities to query available resources.

In a scenario where the user has subscribed to a service with very high availability and accepts to be charged for unused resources, the PDG may reserve the resources for the tunnel in advance before the tunnel establishment request is received. This resource reservation may be a part of the tunnel pre-configuration.

Upon having completed pre-configuration the mobile terminal may be assigned a IP address within the WLAN. The mobile terminal may further transmit a tunnel establishment message to the PDG to request the establishment of a tunnel between the network entities for packet data service provision.

If the service request and QoS requirements are similar to the service and QoS requirements determined from the retrieved PDP context, the tunnel can be established faster than in conventional systems. Also the authentication of the mobile terminal during tunnel establishment may be processed faster because the PDG may already have the necessary information from the AAA server to authenticate the mobile terminal.

Additionally the PDG may further already know that the mobile terminal is authorized to retrieve a requested service via the WLAN. Thus, the PDG may establish the desired resources along the tunnel path immediately without additional resource request.

After completion of (or during) the tunnel establishment the PDG may inform the GGSN (Update PDP Context Request) to route the traffic to the PDG.

Figure 2:
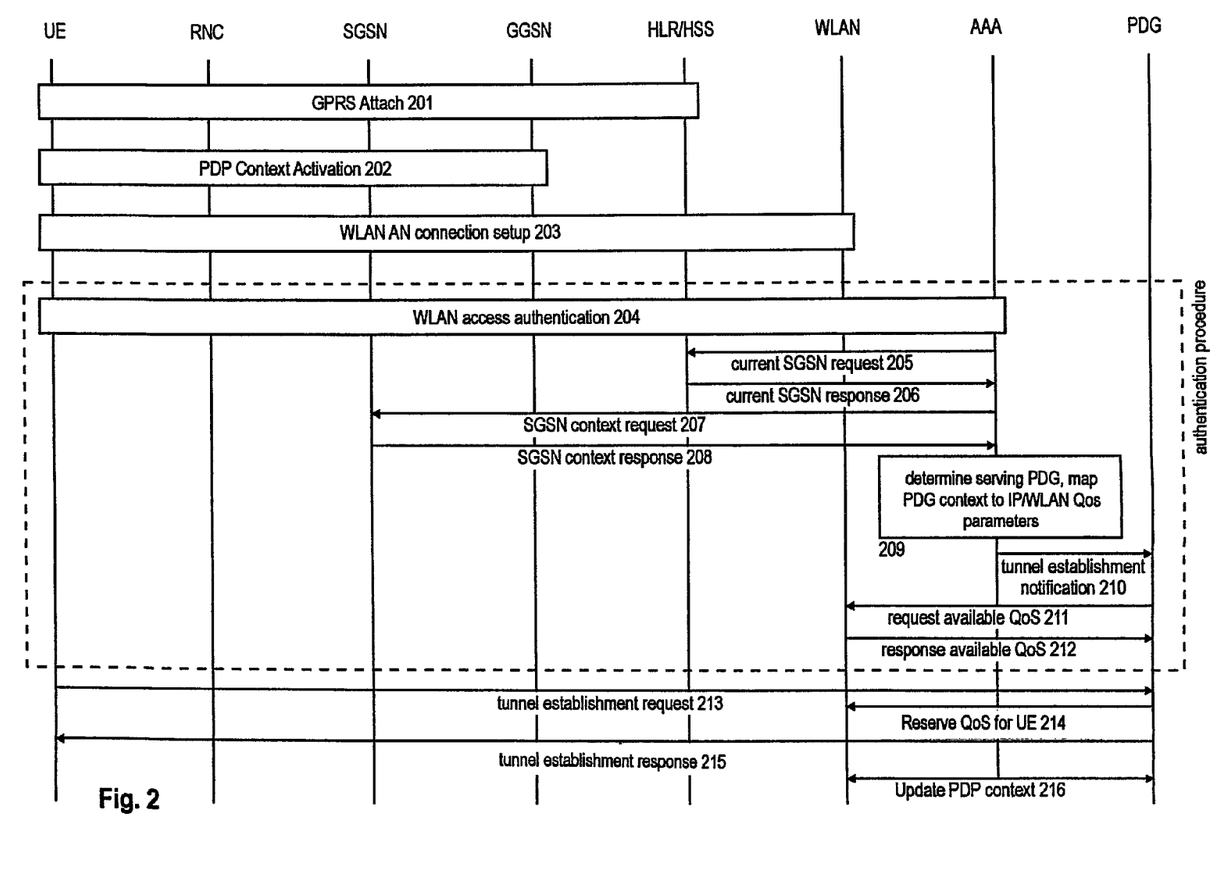
FIG. 2 shows a flow chart of a fast QoS establishment procedure according to an exemplary embodiment of the invention.

Next, an exemplary embodiment of the invention is described with respect to FIG. 2. FIG. 2 shows an exemplary configuration procedure of a connection between the mobile terminal and a packet data gateway during the mobile terminal being handed over from an originating access network, being a UTRAN for exemplary purposes, to a target access network, which is again a WLAN for exemplary purposes.

First, a GPRS Attach procedure 201 is performed for the mobile terminal. The Mobile terminal may in PMM connected state, and the MM context is established in SGSN. Further, a PDP context activation procedure 202 is initiated to activate a packet data service via the UTRAN. The PDP context is thereby established in SGSN and GGSN.

Upon detecting the presence of a WLAN access network, the terminal may associate with the WLAN access network 203. In a WLAN Access Authentication 204 the NAI is used to identify the user and a NAS-IP address is transmitted to the AAA server (optionally an AP MAC address or a notified AR address (APID) can be included by the mobile terminal in the EAP message exchange).

Next, the HLR/HSS is requested 205 by the AAA server about the current serving SGSN of the user. The HLR/HSS may send 206 the address or number of the current SGSN for the IMSI to the AAA Server.

Upon receiving this information, the AAA Server may initiate a SGSN context request 207 to the 3G SGSN. Next, the SGSN sends SGSN context response 208 including the MM context and PDP context to the AAA server. From the context information the AAA server may determine 209 (from the APN) a serving PDG and the required QoS (from the QoS Profiles).

Next, the AAA server may inform 210 the serving PDG on a possible upcoming tunnel establishment request, the QoS requirements and optionally authentication parameters. Optionally, the serving PDG may query 211 available resources for the WLAN connection before the tunnel establishment request is received. When doing so, the serving PDG is informed 212 about available resources on the path to the WLAN UE.

Further, based on the received context information and on the optionally available information on the resources in the target WLAN, the PDG may pre-configure a tunnel for the mobile terminal, i.e. it may create related context information and/or may reserve necessary resources.

Now, the PDG may receive a tunnel establishment message 213 from the mobile terminal. The PDG compares the determined QoS requirements from the PDP context with the QoS requirements received during tunnel establishment and may initiate the QoS reservation 214 immediately. Further, the mobile terminal is informed about the established tunnel 215, the PDP context in the GGSN may be updated 216 and the traffic is forwarded from the GGSN to the PDG.

In the exemplary embodiment described above with reference to FIG. 2, the querying of context information by the authentication server and their provision to the serving packet data gateway have been illustrated as a part of the authentication procedure of the mobile terminal at that target access network, i.e. the WLAN according to the embodiment described above. As has been further indicated, it is either possible to integrate the necessary message exchange to the authentication procedure by reusing standardized messages.

Alternatively, new procedures and message formats may be defined for this purpose. It should be noted, that it is of course not mandatory to require the context information request and reception by the authentication server and the context information provision to the packet data gateway being part of the authentication procedure. Alternatively these tasks may also be performed in parallel thereto. In any case it should be ensured however, that the context information are available to the packet data gateway at a time allowing the packet data gateway to cause a pre-configuration before receiving a request for tunnel establishment from the mobile terminal.

Figure 3:
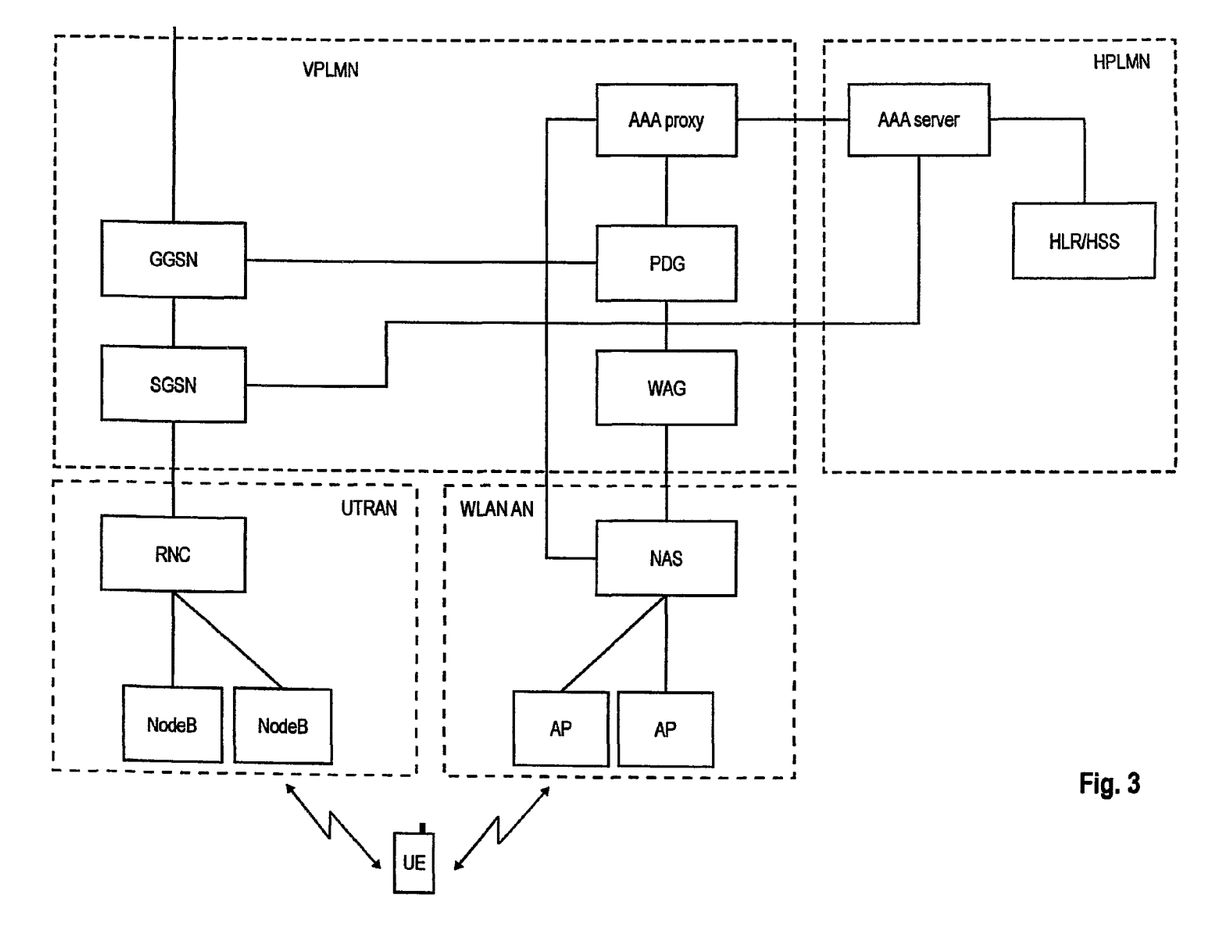
FIG. 3 shows a roaming architecture for a 3GPP system to WLAN interworking supporting a handover of mobile terminals between the heterogeneous networks.

Next, an exemplary embodiment of the present invention relating to the roaming scenario shown in FIG. 3 is described. In this exemplary embodiment it is assumed that the WLAN access network has no direct roaming agreement with the HPLMN but only with a VPLMN. Thus the WLAN Access Authentication procedure is performed between the WLAN access network, an AAA proxy in the VPLMN and the AAA server in the HPLMN. The AAA proxy may thereby simply relay the messages of the authentication procedure.

Similar to the non-roaming case the HPLMN AAA Server can determine the actual SGSN of the mobile terminal from the information stored in the HLR/HSS in the HPLMN. This SGSN can be located in a VPLMN. The AAA server may send a context request message to the old SGSN in the VPLMN. The SGSN sends a context response message (MM context, PDP context) to the AAA server. The AAA server is now informed about the previous APNs and requested and negotiated QoS of the mobile terminal. The AAA server verifies that the mobile terminal is authorized to access similar services from WLAN network.

In the roaming case the AAA Server has to check whether the service can be provided from the HPLMN. If not the HPLMN AAA Server determines, based on the subscription information, if the mobile terminal is allowed to access PDGs and services in the VPLMN. If the mobile terminal is allowed, the AAA server informs the AAA proxy in the VPLMN (or a PDG in the VPLMN) about the identity of the mobile terminal, the identity of the WLAN, the possibly requested services, related QoS and information for mutual authentication of tunnel establishment. The AAA proxy relates the information to the appropriate PDG and the PDG queries resources for the tunnel similar to the non-roaming case.

In the previous exemplary embodiment of the invention, a handover between heterogeneous access networks both being connected to a common visited core network (VPLMN) has been considered. It should be noted that the present invention is also applicable to a handover between heterogeneous wireless access networks, wherein the originating wireless access network is under control of the mobile terminals home core network and the target wireless access network is under control of a visited core network.

Another embodiment of the present invention relates to the implementation of the above described various embodiments using hardware and software. It is recognized that the various above mentioned methods as well as the various logical blocks, modules, circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for configuring connection parameters of a connection between a mobile terminal and a target wireless access network, wherein the method is performed during a handover of the mobile terminal between heterogeneous wireless access networks from an originating wireless access network to a target wireless access network and comprises:
    providing a packet data service to the mobile terminal via the originating wireless access network,
    maintaining context information on the packet data service in a network node of a core network connected to at least the originating wireless access network, wherein the context information indicates at least quality of service (QoS) constraints of the packet data service,
    authenticating the mobile terminal at the target wireless access network by an authentication server, and
    establishing a tunnel for transporting data packets associated to the packet data service between the mobile terminal and a packet data gateway in a core network via the target wireless access network, wherein the tunnel is at least associated to the QoS constraints,
    wherein the authentication server obtains said context information from said network node maintaining the context information and provides data indicative of the context information to the packet data gateway, and
    the packet data gateway causes a pre-configuration of at least the tunnel's QoS constraints based on the data received from the authentication server before establishing the tunnel.

2. The method according to claim 1, further comprising the authentication server obtaining an identification of the network node maintaining the context information from a database comprising information on the mobile terminal.

3. The method according to claim 2, further comprising receiving at the authentication server a network access identifier of the mobile terminal during the authentication, and
    deriving at the authentication server a unique identifier of the mobile terminal from said network access identifier.

4. The method according to claim 3, further comprising transmitting the unique identifier of the mobile terminal to the database and
    receiving at the authentication server said identification of the network node maintaining the context information from the database.

5. The method according to claim 4, further comprising using by the authentication server said identification of the network node to address the network node maintaining the context information when obtaining the context information.

6. The method according to claim 1, further comprising obtaining by the packet data gateway information on available resources in the target wireless access network, and wherein the pre-configuration of at least the tunnel's QoS constraints is also based on the available resources in the target wireless access network.

7. The method according to claim 1, further comprising transporting at least one authentication message from the target wireless access network to the authentication server in the authentication process, said at least one authentication message comprising an identifier of the target wireless access network, and
deriving by the authentication server a routing area identifier, identifying the network node maintaining the context information, from the identifier of the target wireless access network.

8. The method according to claim 7, wherein the routing area identifier is included in a message requesting the context information from the network node maintaining the context information.

9. The method according to claim 1, wherein the data provided from the authentication server to the packet data gateway further indicates at least one of the identity of the mobile terminal, the target wireless access network, requested services by the mobile terminal, and information for mutual authentication during tunnel establishment.

10. The method according to claim 1, further comprising causing by the packet data gateway a pre-configuration of at least one of a security context comprising at least one security association, encryption keys, and a header compression scheme for header compression of data packets for packet data exchange via the tunnel.

11. The method according to claim 1, wherein the mobile terminal roams in a visited core network comprising said packet data gateway and said network node maintaining the context information,
wherein the mobile terminal is handed over from a visited originating wireless access network to a visited target wireless access network and
wherein the authentication of the mobile terminal at the target wireless access network involves a proxy authentication server in the visited core network and an authentication server in the home core network of the mobile terminal.

12. The method according to claim 1, wherein the packet data gateway and the network node maintaining the context information are located in the same core network or in distinct core networks respectively.

13. The method according to claim 1, wherein the core network is a General Packet Radio Service (GPRS) network.

14. The method according to claim 1, wherein the originating wireless access network is a radio access network of a mobile communication network and the target wireless access network is a Wireless Local Area Network (WLAN).

15. A packet data gateway located in a core network of a mobile communication system for configuring a connection for a packet data service to be provided to a mobile terminal via a target wireless access network, the mobile terminal being handed over between heterogeneous wireless access networks from an originating wireless access network to said target wireless access network, the packet data gateway comprising:
a communication unit for communicating with the mobile terminal and an authentication server in the core network,
wherein the communication unit is configured to establish a tunnel between the packet data gateway and the mobile terminal for exchanging data packets of the packet data service via the target wireless access network, the tunnel being at least associated to quality of service (QoS) constraints, and
wherein the communication unit is further configured to receive data from the authentication server, the data being indicative of at least the QoS constraints of the provided packet data service, and
a configuration unit for causing a pre-configuration of at least the tunnel's QoS constraints based on the data received from the authentication server before establishing the tunnel.

16. The packet data gateway according to claim 15, wherein the communication unit is configured to receive data provided from the authentication server which indicates at least one of the identity of the mobile terminal, the target wireless access network, requested services by the mobile terminal and information for mutual authentication during tunnel establishment.

17. The packet data gateway according to claim 15, wherein the configuration unit is further configured to cause a pre-configuration of at least one of a security context comprising at least one security association, encryption keys, and a header compression scheme for header compression of data packets transported via the tunnel for packet data exchange via the tunnel.

18. The packet data gateway according to claim 15, wherein the communication unit is configured to obtain information on available resources in the target wireless access network from an access server of the target wireless access network, and
the configuration unit is configured to pre-configure the tunnel based on the available resources in the target wireless access network.

19. An authentication server located in a core network of a mobile communication system communicating with a packet data gateway and authenticating a mobile terminal in a target wireless access network, the mobile terminal being handed over between heterogeneous wireless access networks from an originating wireless access network to said target wireless access network, the authentication server comprising:
an authentication unit for authenticating the mobile terminal at the target wireless access network, and
a communication unit for obtaining context information from a network node within the core network, wherein the context information indicates at least quality of service (QoS) constraints of a packet data service provided via the originating wireless access network,
wherein the communication unit is configured to provide data indicative of the context information to the packet data gateway to enable the packet data gateway to pre-configure at least the QoS constraints of a tunnel for providing the data packet service to the mobile terminal via the target wireless access network.

20. The authentication server according to claim 19, wherein the communication unit is configured to receive a network access identifier during the authentication of the mobile terminal, and
the authentication server further comprises a processing unit for deriving a unique identifier of the mobile terminal from said network access identifier.

21. The authentication server according to claim 20, wherein the communication unit is configured to transmit the unique identifier of the mobile terminal to a database comprising information on the mobile terminal and
is further configured to receive an identification of the network node maintaining the context information from the database.

22. The authentication server according to claim 20, wherein the communication unit is configured to receive at least one authentication message from the target wireless access network in the authentication process, said at least one authentication message comprising an identifier of the target wireless access network, and the processing unit is configured to derive a routing area identifier, identifying the network node maintaining the context information, from the identifier of the target wireless access network.

23. The authentication server according to claim 22, wherein the communication unit is configured to address the network node maintaining the context information by the derived routing area identifier when obtaining the context information.

24. The authentication server according to claim 19, wherein the data provided from the authentication server to the packet data gateway further indicates at least one of the identity of the mobile terminal, the target wireless access network, requested services by the mobile terminal, and information for mutual authentication during tunnel establishment.

25. A non-transitory computer readable medium for storing instructions that, when executed by a processor of a packet data gateway located in a core network of a mobile communication system, cause the configuration of a connection for a packet data service to be provided to a mobile terminal via a target wireless access network, the mobile terminal being handed over between heterogeneous wireless access networks from an originating wireless access network to said target wireless access network, by:

communicating with the mobile terminal and an authentication server in the core network, establishing a tunnel between the packet data gateway and the mobile terminal for exchanging data packets of the packet data service via the target wireless access network, the tunnel being at least associated to quality of service (QoS) constraints, receiving data from the authentication server, the data being indicative of at least the QoS constraints of the provided packet data service, and causing a pre-configuration of at least the tunnel's QoS constraints based on the data received from the authentication server before establishing the tunnel.

26. A non-transitory computer readable medium for storing instructions that, when executed by a processor of an authentication server located in a core network of a mobile communication system, cause a communication between the authentication server and a packet data gateway and an authentication of a mobile terminal in a target wireless access network, the mobile terminal being handed over between heterogeneous wireless access networks from an originating wireless access network to said target wireless access network, by:

authenticating the mobile terminal at the target wireless access network, obtaining context information from a network node within the core network, wherein the context information indicates at least quality of service (QoS) constraints of a packet data service provided via the originating wireless access network, and providing data indicative of the context information to the packet data gateway to enable the packet data gateway to pre-configure at least the QoS constraints of a tunnel for providing the data packet service to the mobile terminal via the target wireless access network.

* * * * *